UNITED STATES PATENT OFFICE.

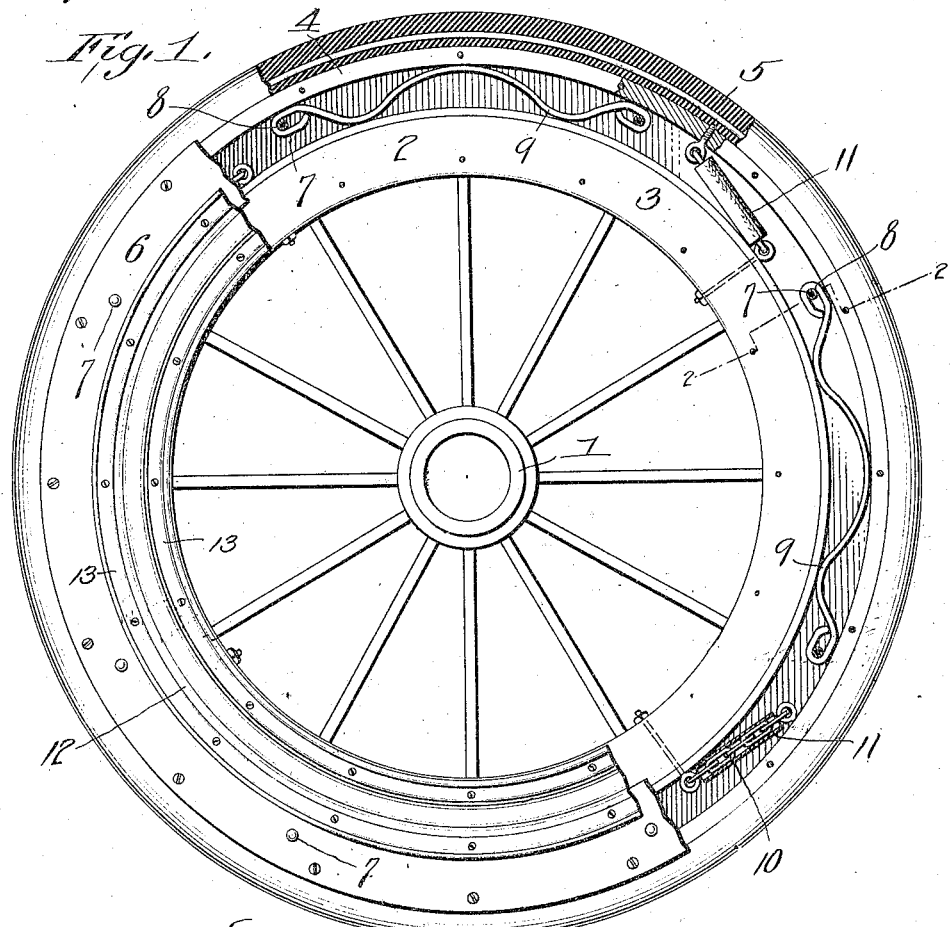
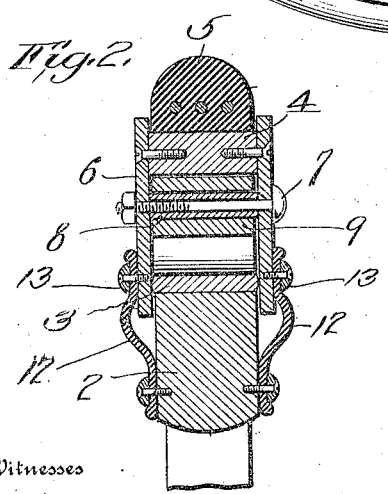
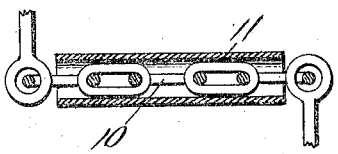

JOSEPH PHILLIP PAULISSEN, OF KANKAKEE, ILLINOIS.

SPRING-WHEEL.

965,122.  Specification of Letters Patent.  Patented July 19, 1910.

Application filed May 25, 1909.  Serial No. 498,275.

*To all whom it may concern:*

Be it known that I, JOSEPH PHILLIP PAULISSEN, a citizen of the United States, residing at Kankakee, in the county of Kankakee and State of Illinois, have invented a new and useful Improvement in Spring Wheels, of which the following is a specification.

This invention relates to a spring wheel and the object of the invention is a wheel which will combine to as great an extent as possible, the resilience of a pneumatic cushion wheel and at the same time be immune from puncture, through the absence of any part which could be readily punctured or if punctured which would be affected so far as the use of the wheel was concerned by a puncture.

The invention consists of two concentric rims spaced apart by means of peripherally arranged springs.

In the accompanying drawings, Figure 1 is a side elevation, partly in section, and parts being broken away. Fig. 2 is a section upon the line 2—2 of Fig. 1, both side plates and dust guard being shown. Fig. 3 is a detail sectional view illustrating a chain construction.

In these drawings 1 represents a wheel of the ordinary construction, said wheel being provided with a wooden felly 2 which carries a metal tire 3. This wheel is complete in itself and may be the ordinary wagon or buggy wheel. Concentric with this wheel is an iron rim 4 which carries a rubber tire 5 of any desired kind. The rim 4 is of considerably greater diameter than the tire 3, and carries upon its opposite sides iron plates 6 which iron plates not only overlap the rim of the wheel 1 thus covering the space between the wheel 1 and the rim 4 but they also project beyond said rim 4 thus serving as flanges for holding the rubber tire 5 in place. Suitable bolts 7 pass through the plates 6 and through the space between the rim 4 and the wheel 1, said bolts being adjacent the rim 4 and between the plates 6. These bolts carry short sections of pipe 8 which pipe sections form sleeves for the bolts.

Compound springs 9 bear upon the inner face of the rim 4 and upon the periphery of the tire 3, each end of said springs being bent around and secured to one of the pipe sections 8. These springs serve to space the rim 4 from the wheel 1 and act as a support in one position of the wheel for the rim 4 and in another position for the wheel 1. In order to prevent the rim 4 being twisted out of place I connect the rim 4 and the wheel 1 by means of chains 10 arranged at a tangent to the wheel 1 so that they do not interfere with the spring action of the wheel, and to prevent any rattling of the chains they are preferably inclosed in rubber sleeves 11. I also cover the joint between the iron plates 6 and the wooden felly 2 with strips of leather or rubber as shown at 12, such strips preventing dust and dirt from working in between the plates 6 and the sides of the felly, but being flexible allowing free sliding movement of the said plates upon the felly. A strip 13 of metal holds the rubber or other covering firmly in place.

What I claim is:—

The combination with a vehicle wheel, of a concentric rim of greater diameter than the wheel spaced therefrom, metal plates carried by said rim and overlapping the wheel upon opposite sides, bolts carried by said metal plates, said bolts passing through the space between the rim and wheel, compound curved springs having their central portions bearing upon the rim, having their end portions bent around said bolts, and having intermediate portions bearing upon the wheel, and upon opposite sides of the central portion, chains secured at one end to the wheel and at the other end to the rim, sleeves inclosing said chains, said sleeves and chains being arranged between the springs and tangentially with respect to the wheel.

JOSEPH PHILLIP PAULISSEN.

Witnesses:
  GEO. H. EHRICH,
  E. B. GRAY.